United States Patent [19]
O'Brien

[11] Patent Number: 5,464,103
[45] Date of Patent: Nov. 7, 1995

[54] DISPLAY RACK

[75] Inventor: Paul O'Brien, Seal Beach, Calif.

[73] Assignee: Side-Kik Corporation, Cypress, Calif.

[21] Appl. No.: 104,189

[22] Filed: Aug. 9, 1993

[51] Int. Cl.⁶ .................................................. A47F 3/14
[52] U.S. Cl. ............................ 211/133; 211/88; 211/126
[58] Field of Search ................................ 211/133, 187, 211/153, 190, 184, 90, 88, 86, 87, 126; 108/107, 108, 109

[56] References Cited

U.S. PATENT DOCUMENTS

| | | | |
|---|---|---|---|
| Re. 29,977 | 5/1979 | Lundqvist | 108/108 |
| 2,213,115 | 8/1940 | Bales | 108/109 |
| 2,794,555 | 6/1957 | Schild | 211/135 |
| 2,796,158 | 6/1957 | Miles et al. | 211/187 X |
| 2,839,350 | 6/1958 | Hill et al. | 211/153 X |
| 2,845,188 | 7/1958 | Rosenquist | 211/184 |
| 2,915,193 | 12/1959 | Bromberg | 211/135 |
| 2,936,904 | 5/1960 | Streater | 211/147 |
| 3,052,363 | 9/1962 | Foote, Jr. et al. | 108/109 |
| 3,100,460 | 8/1963 | McElroy | 108/109 |
| 3,120,200 | 2/1964 | Travis | 108/107 |
| 3,209,919 | 10/1965 | Hoogstoel | 211/90 |
| 3,341,026 | 9/1967 | Spitler | 211/88 |
| 3,367,291 | 2/1968 | Evans | 108/64 |
| 3,481,485 | 12/1969 | Hess | 108/109 X |
| 3,844,231 | 10/1974 | Peacock | 108/107 |
| 3,999,775 | 12/1976 | Brongo | 211/187 X |
| 4,037,729 | 7/1977 | DeSisto | 108/107 X |
| 4,494,661 | 1/1985 | Krusche | 211/87 |
| 4,611,866 | 9/1986 | Everett | 211/190 X |
| 4,671,417 | 6/1987 | O'Brien | 211/59.1 |
| 4,791,898 | 9/1988 | Howard et al. | 211/133 X |
| 5,101,988 | 4/1992 | Meyer | 211/88 |

FOREIGN PATENT DOCUMENTS 250143   4/1964   Australia ............................ 211/187

Primary Examiner—Ramon O. Ramirez
Assistant Examiner—Korie H. Chan
Attorney, Agent, or Firm—Poms, Smith, Lande & Rose

[57] ABSTRACT

A display rack having interconnecting sides, back and bottom. The back has a plurality of spaced slots in vertically and horizontally aligned rows. Trays are provided which connect to the back and the side walls. The same slots can be used to hold the trays in position or support fixtures having products suspended therefrom.

28 Claims, 8 Drawing Sheets

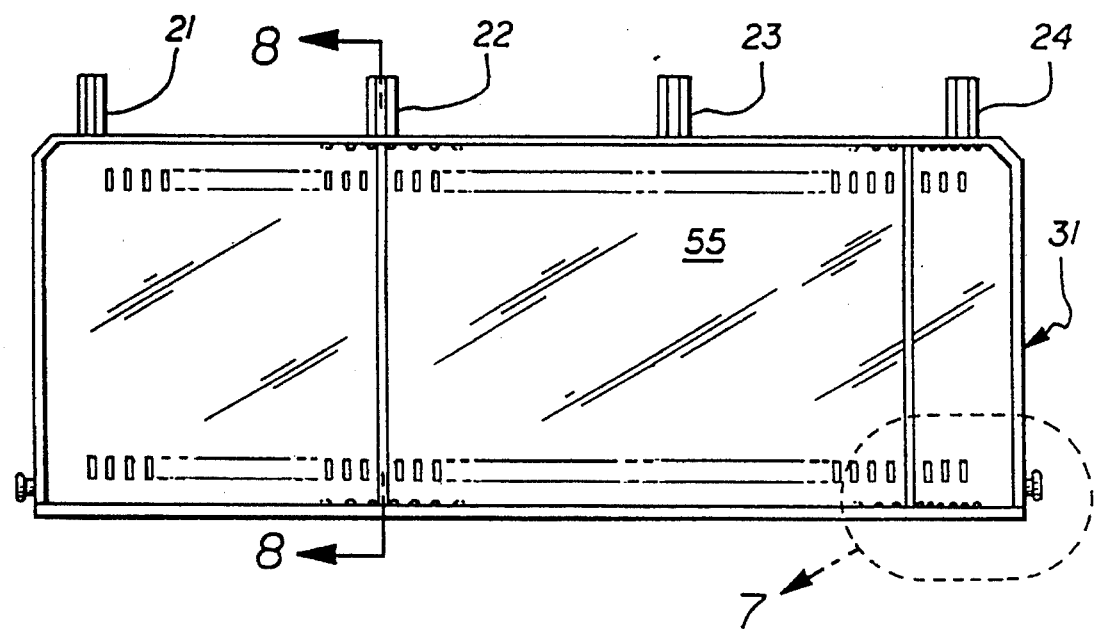
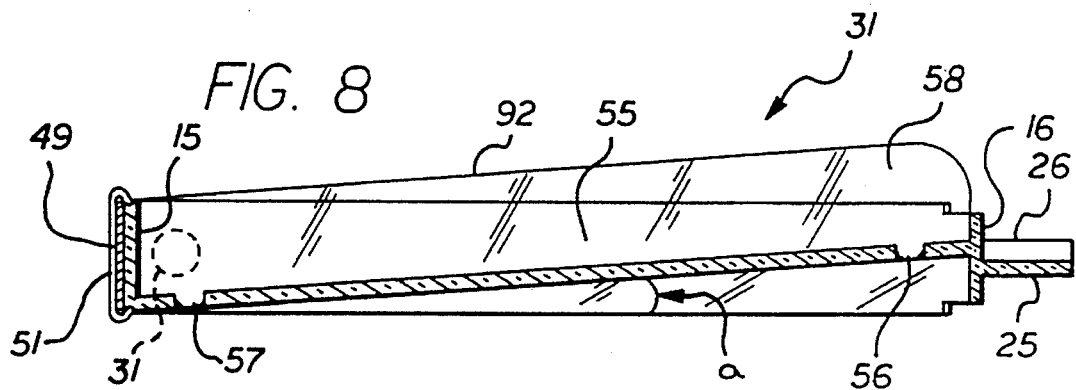
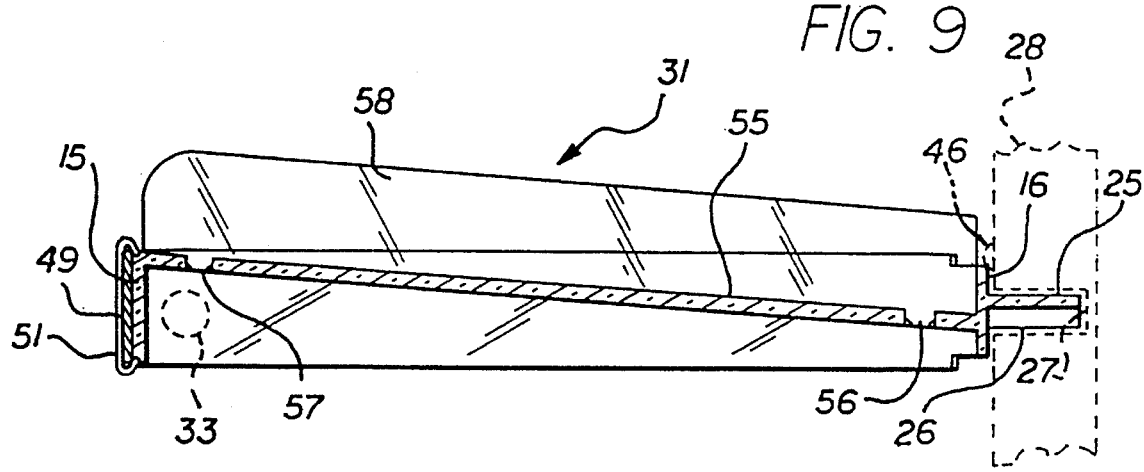

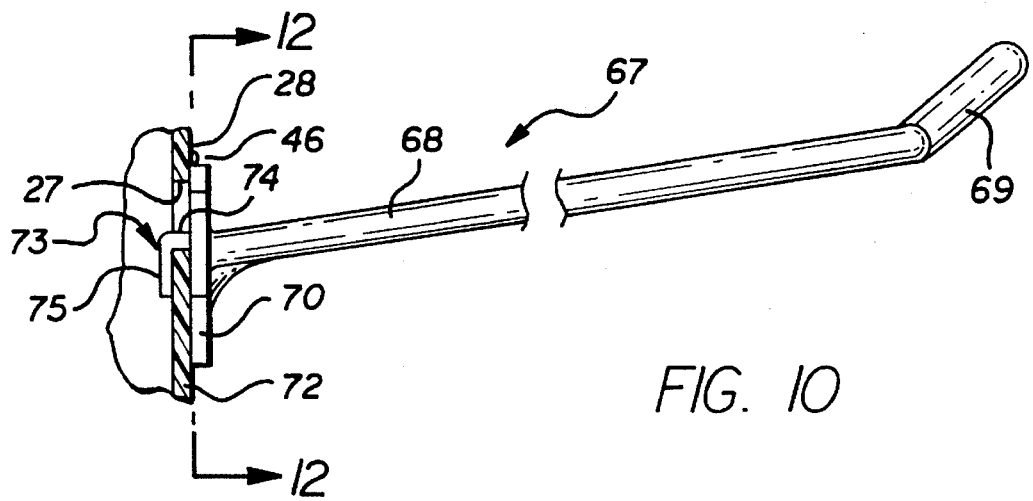
FIG. 10
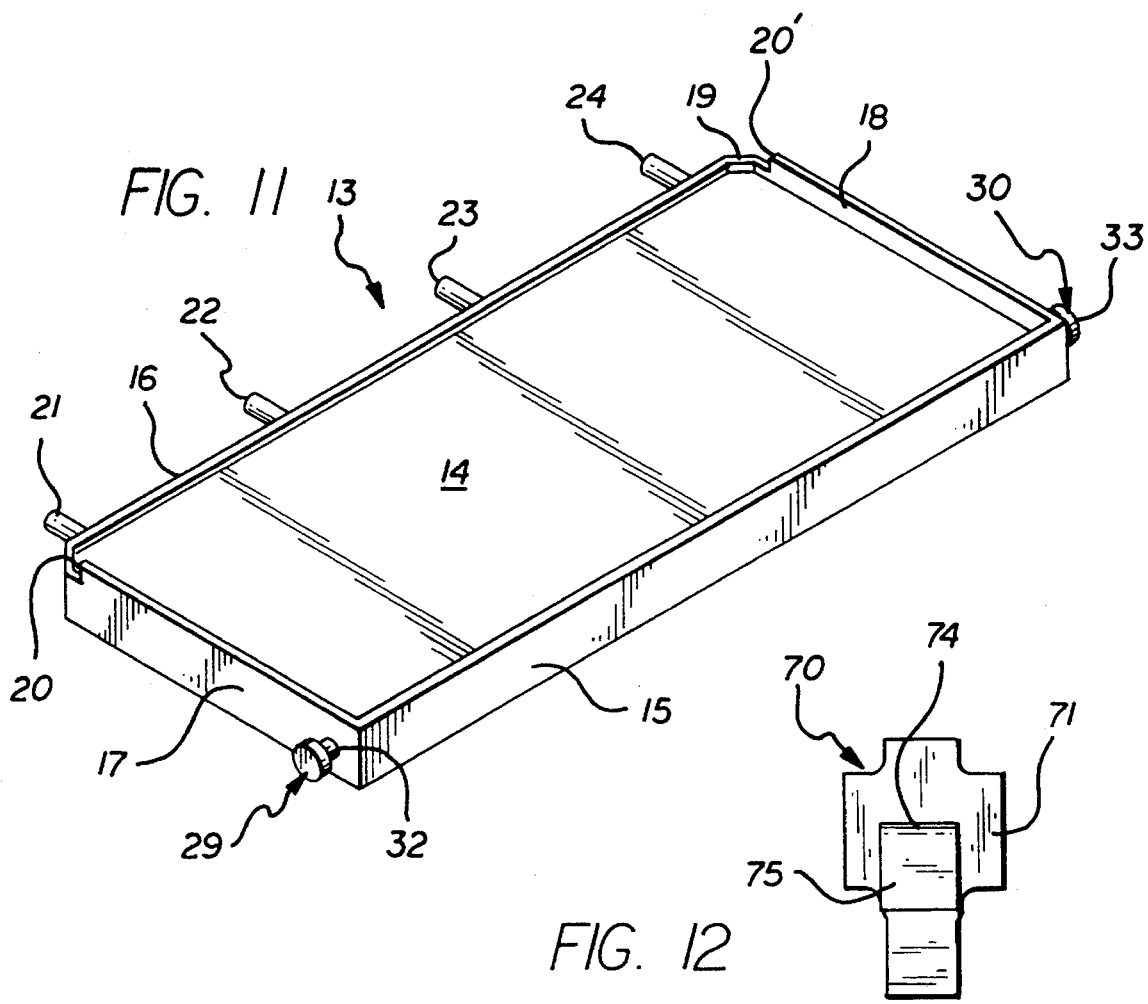
FIG. 11
FIG. 12

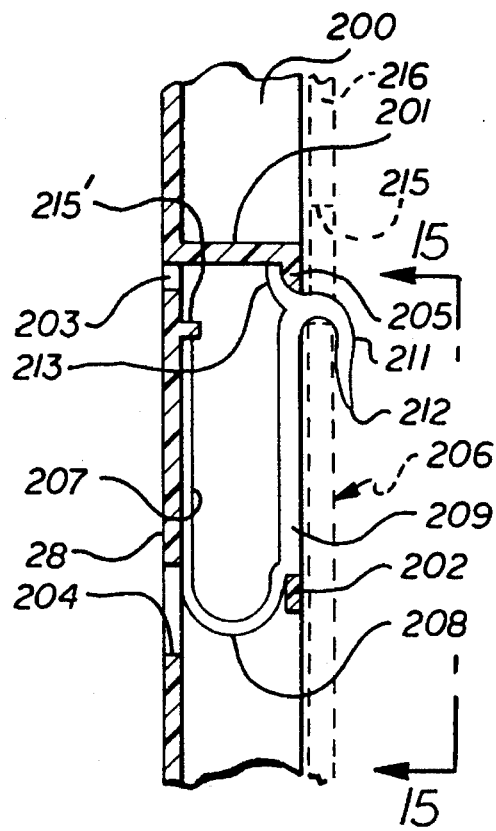
FIG. 13
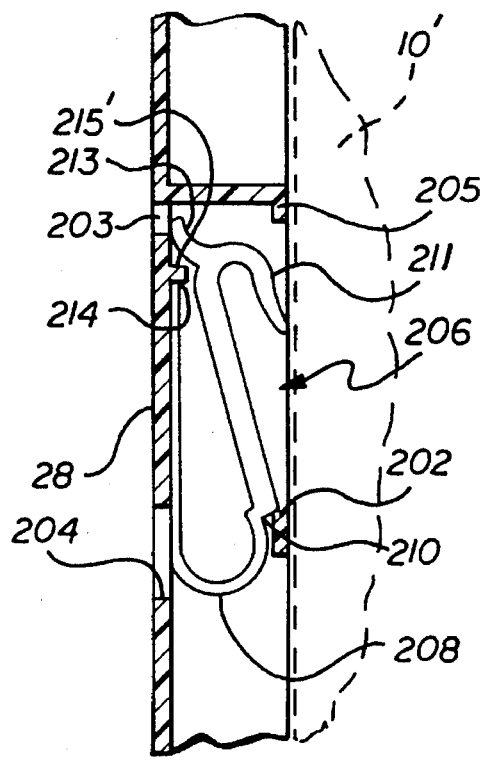
FIG. 14
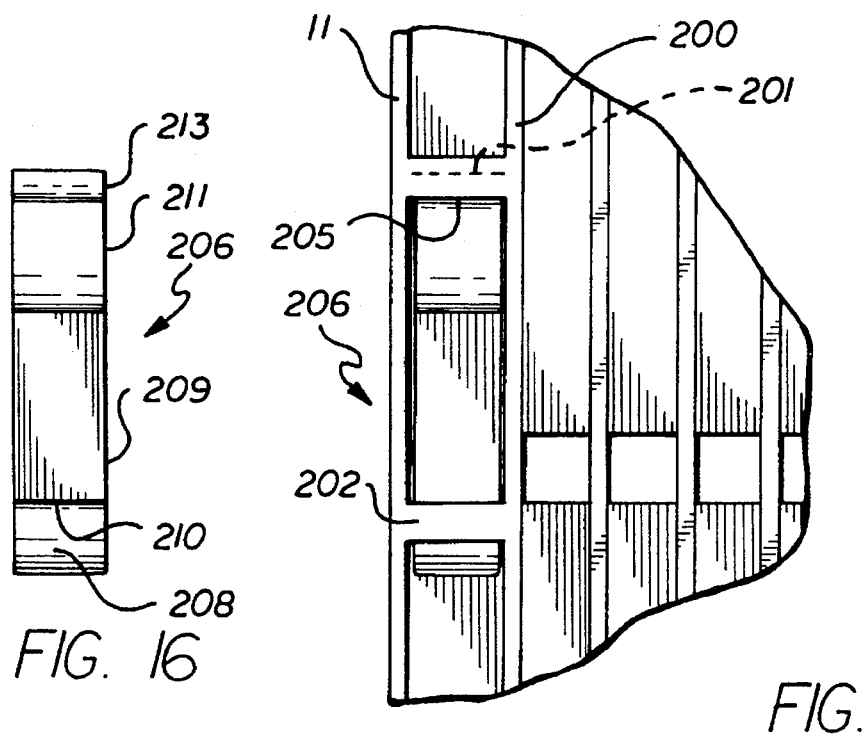
FIG. 16
FIG. 15

5,464,103

DISPLAY RACK

BACKGROUND OF THE INVENTION

1. Field of the Invention

The invention relates to display racks; and, more particularly, to a display rack that can be quickly and easily assembled with varied spacing product placement thereon.

2. Description of the Prior Art

Display racks are well known in the art. However, some racks, such as corrugated racks, are not very durable and, if made of more rigid materials, are difficult to assemble and set up. However, such racks may be desirable in high traffic areas in stores or the like, or where moisture might be present such as resulting from floor washing.

Also, some display racks do not allow for much variation between product spacing and thus cannot be accommodated easily to all types and sizes of products.

There is thus a need for a display rack which can be quickly and easily assembled and be used to display products in a manner allowing variations in spacing therebetween.

SUMMARY OF THE INVENTION

It is an object of this invention to provide an improved display rack.

It is a further object of this invention to provide a semi-rigid display rack made of components which can be assembled together quickly and easily.

It is still a further object of this invention to provide a display rack which can be attached to preexisting store displays or fixtures and be easily reconfigured to hold different product lines.

These and other objects are preferably accomplished by providing a display rack having interconnecting side walls, a back wall, a bottom shelf, and a header for signage. The back wall has a plurality of spaced slots in vertically and horizontally aligned rows. Trays are provided which connect to both the back wall and the side walls. The same slots can be used to hold the trays in position or support fixtures having products suspended from custom designed hooks.

BRIEF DESCRIPTION OF THE DRAWING

FIG. 6 is a top plan view of a tray of the rack of FIG. 1 shown removed therefrom;

FIG. 8 is a view taken along lines 8—8 of FIG. 6;

FIG. 9 is a view similar to FIG. 8 showing the opposite side thereof;

FIG. 10 is a view taken along lines 10—10 of FIG. 1;

FIG. 11 is a perspective view of a tray which can be used as the top or bottom wall;

FIG. 12 is a view taken along lines 12—12 of FIG. 10, the rear wall being omitted for convenience of illustration;

FIG. 13 is in sectional view, similar to FIG. 10, showing a modification of the rack of FIG. 1 so a hanging hook can be installed on the back side thereof;

FIG. 14 is a view similar to FIG. 13 showing a second display rack in dotted lines disposed against the first display rack moving the hanging hook inwardly;

FIG. 15 is a view taken along lines 15—15 of FIG. 13;

FIG. 16 is an elevational view of the hook alone of FIGS. 13 to 15;

DESCRIPTION OF THE PREFERRED EMBODIMENT

Figure 1:
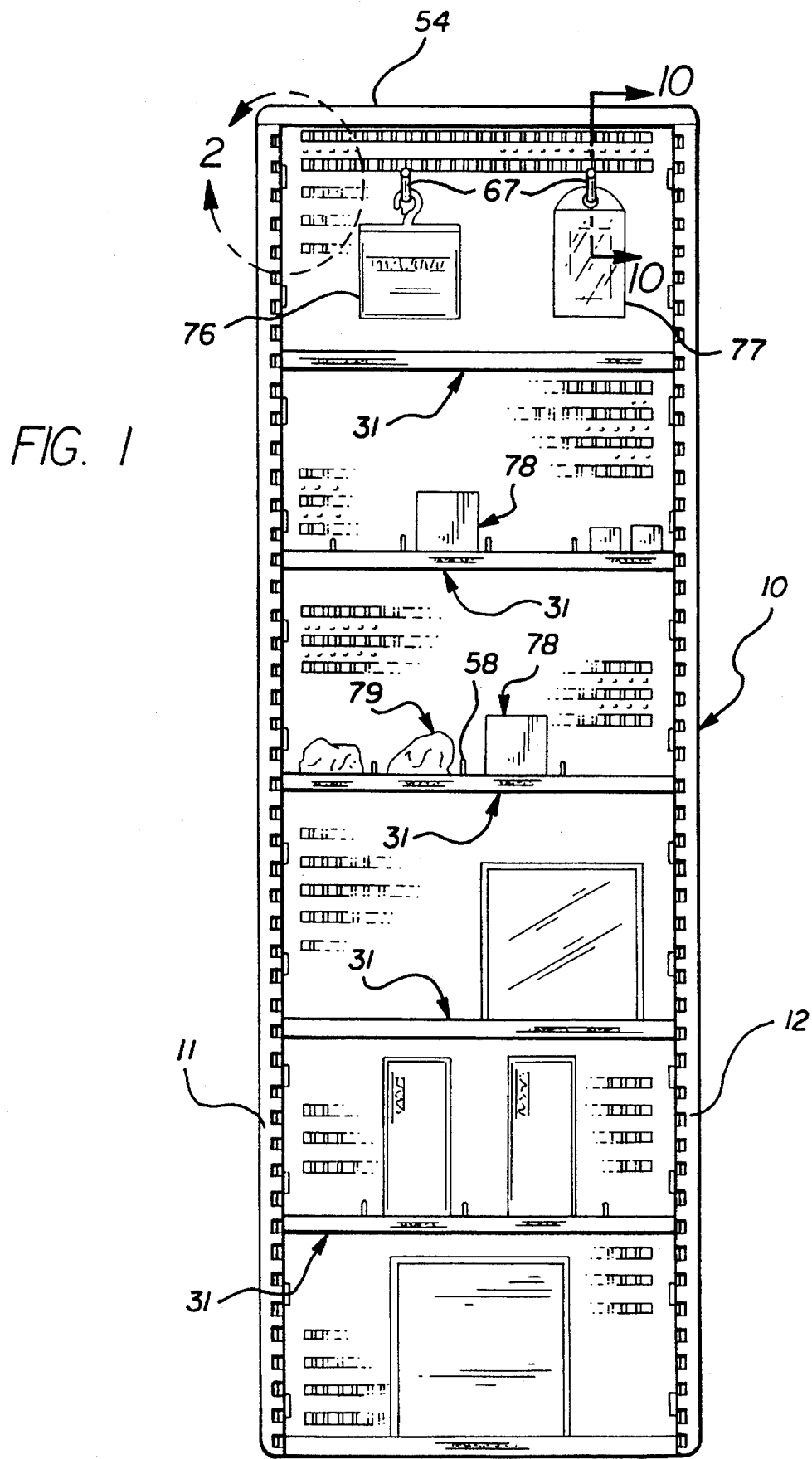
FIG. 1 is an elevational front view of the display rack of the invention.

Referring now to FIG. 1 of the drawings a display rack 10 is shown comprised of a pair of spaced upright side walls 11, 12 connected to bottom member 13.

Figure 5:
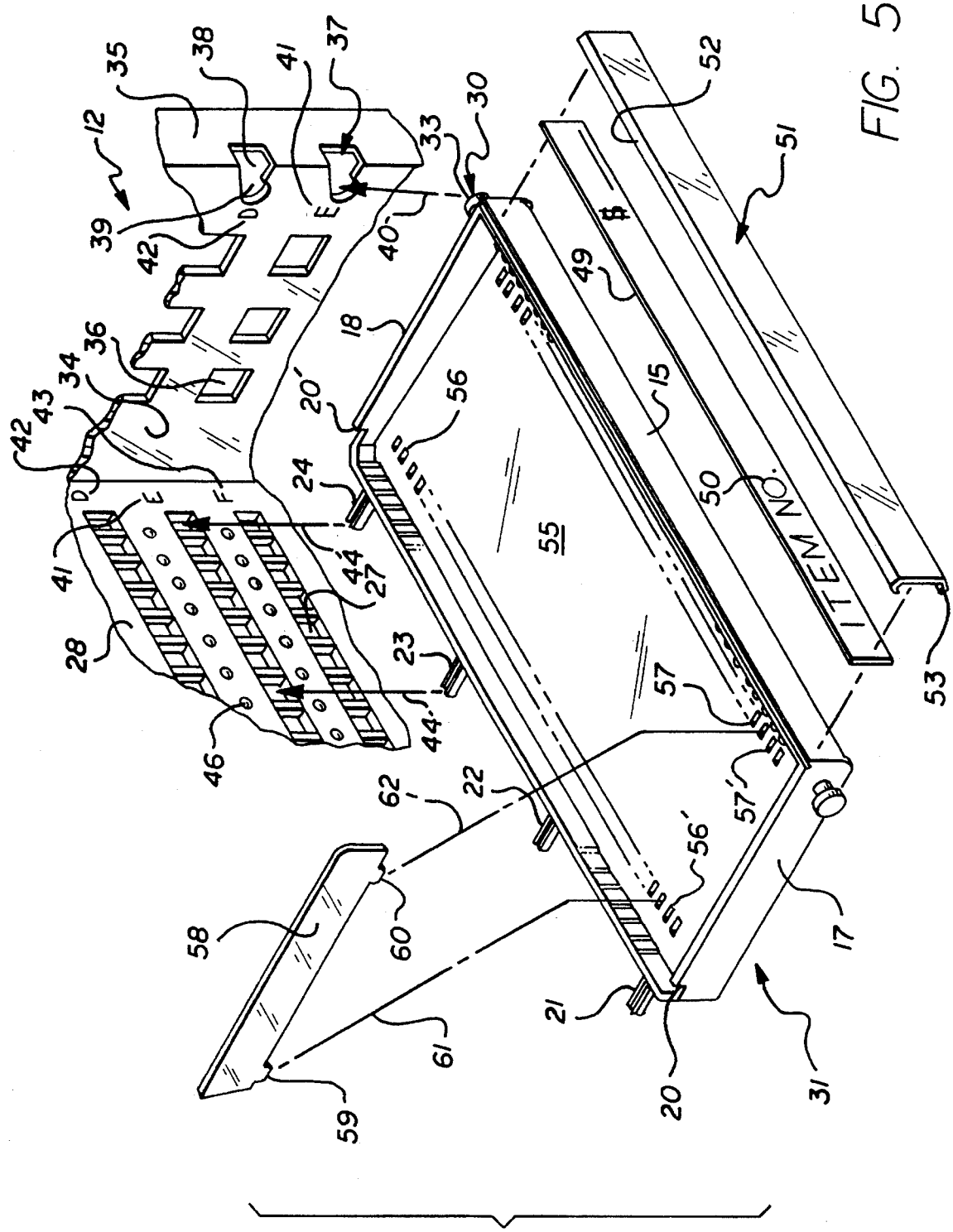
FIG. 5 is an exploded view of a portion of the rack of FIG. 1 illustrating assembly of components thereof.

Bottom member 13 is shown in FIG. 11. Bottom member 13 has a central generally flat and rectangular tray portion 14 defined on all sides by front peripheral wall 15, rear peripheral wall 16, and interconnecting peripheral side walls 17, 18. It is noted that member 13 is the same as tray 31, vertically spaced along rack 10, one of which is shown in FIG. 5. Thus, like numerals of member 13 refer to like numerals of tray 31. The intersection of walls 16, 18 may be angled, as at angled wall 19, for cosmetic purposes. The overall height of rear wall 16 (see FIG. 5) may be less than the overall height of side walls 17, 18 forming shoulders 20, 20' at the intersection of wall 16 with walls 17, 18 for reasons to be discussed.

A plurality of spaced pegs, such as pegs 21–24, may extend rearwardly from wall 16. These pegs 21 to 24, as seen in FIGS. 5 and 6, may be a resilient material having a flat base portion 25 (FIG. 8) and a centrally located upstanding rib 26 (all of the trays and bottom member 13, may have identical rearwardly protruding pegs, as pegs 21 to 24). Pegs 21 to 24 are adapted to be inserted into square-shaped holes or openings 27 (FIG. 5) in the rear wall 28 of display rack 10 as will be discussed.

Referring again to FIG. 11, a pair of fastening members 29, 30 extend outwardly from side walls 17, 18, respectively, adjacent front wall 15. Fastening members 29, 30 each include a round peg 32 capped by a large diameter circular cap 33.

As seen in FIG. 5, each side wall 11, 12 has a main planar body portion 34 and a front vertical flange 35 extending normal to body portion 34 and in a direction outwardly thereof. A plurality of spaced square-shaped openings 36 are provided in each body portion 34 in linearly aligned rows (e.g., three such openings in each horizontal row spaced from, and linearly aligned with, a like number of openings in an adjacent row).

A plurality of vertically spaced fastening member receiving notches 37 are provided at spaced locations along flanges 35 and the intersection thereof with body portion 34.

Each notch 37 includes a first opening 38 of relatively square configuration leading into a rounded opening 39 as seen in FIG. 5.

As indicated by the dotted line 40 in FIG. 5, the cap 33 of the fastening member 30 is inserted into opening 37 and peg 32 is moved inwardly until it rests in opening 39. At the same time, pegs 21 to 24 are receivable in spaced openings 27 in rear wall 28.

Figure 3:
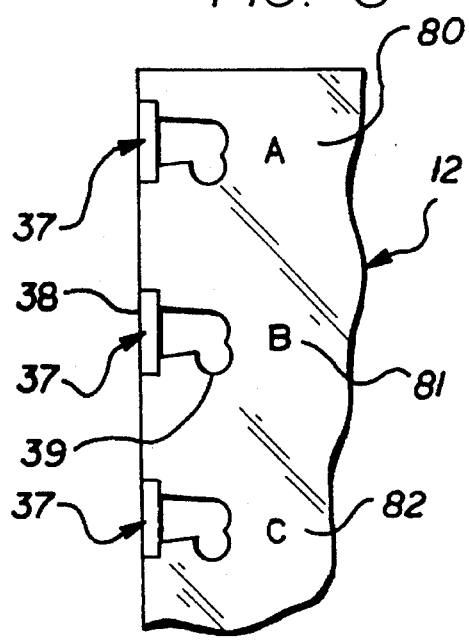
FIG. 3 is a view taken along lines 3—3 of FIG. 2.

It can be appreciated that there are more openings 27 in any one horizontal row than there are pegs 21 to 24. Also, contrasting indicia 41, 42 may be provided adjacent notches 37 (see also FIG. 3 wherein contracting indicia 80 to 82—letters A, B, and C, respectively—are shown associated with vertically spaced notches 37) and openings 27 to assist in proper alignment. For example, indicia E is associated with one notch 37 in FIG. 5 and one horizontal row of openings 27 are indicated by the same indicia 41. Thus, tray 31 of FIG. 5 is inserted into notches 37, indicated by indicia 41 (side 11 not visible in FIG. 5) with pegs 21 to 24 of tray 31 insertible into openings 27, as seen by arrows 44, 45, associated with indicia E or 41 adjacent one horizontal row of openings 27 in rear wall 28. In like manner, a second tray 31 may be inserted into the notches and openings indicated by indicia 42 or D. Tray 31 is additionally supported by the fact that the tray also rests on the small nubs 46.

Figure 2:
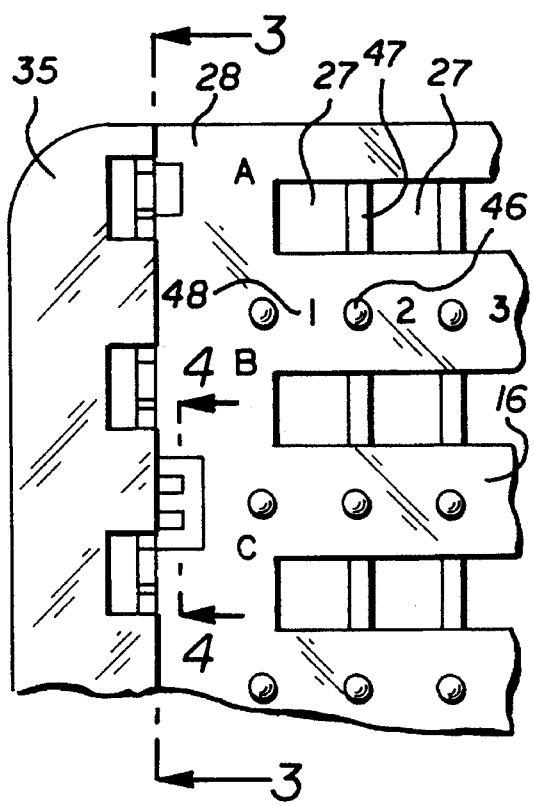
FIG. 2 is a detailed view of a portion of the rack of FIG. 1 as indicated by arrow 2.

A plurality of spaced protruding nubs 46 are provided in rear wall 28 located between successive horizontal rows of openings 27. As seen in FIG. 2, vertical flanges 47 separate successive openings 27. Nubs 46 are vertically aligned with flanges 47 as shown. Indicia 48 may be associated with each nub 46 (e.g., 1, 2, 3, etc.). As seen in FIG. 2, some nubs 46 may be located between the openings 27 and side walls 11, 12. Also, the upper edges of flanges 35 may be rounded for aesthetic reasons.

Referring again to FIG. 5, each front wall 15 of trays 31 may have indicia associated therewith for identifying the products displayed on the various shelves or trays 31. Thus, removable inserts 49, of a configuration similar to wall 15, may be provided having indicia 50 thereon. A transparent panel 51, having inwardly curved upper and lower edges 52, 53, respectively, is adapted to snap fit onto wall 15 (see also FIG. 8) thereby removably retaining insert 49 between panel 51 and wall 15. The insert 49, and of course indicia 50, can be quickly and easily changed.

As seen in FIG. 1, rack 10 is closed off at top by a top member 54. This member 54 is otherwise identical to member 13 of FIG. 11. However, it is to be understood that the tray portions 14 of members 13 and 54 may be planar and imperforate; however, as seen in FIGS. 8 and 9, wherein tray portion 55 is shown in side view (tray portion 55 being the planar tray portions of trays 31 of FIGS. 1, 5, and 6), the surface thereof may slope from front to rear, e.g., at an angle a of about 4° with respect to the horizontal (FIG. 8). As seen in FIG. 9, trays 31 and top and bottom members 13, 54 may be inserted with tray portions 14, 55 oriented upside down (FIG. 9) thus changing the slope thereof.

Figure 7:
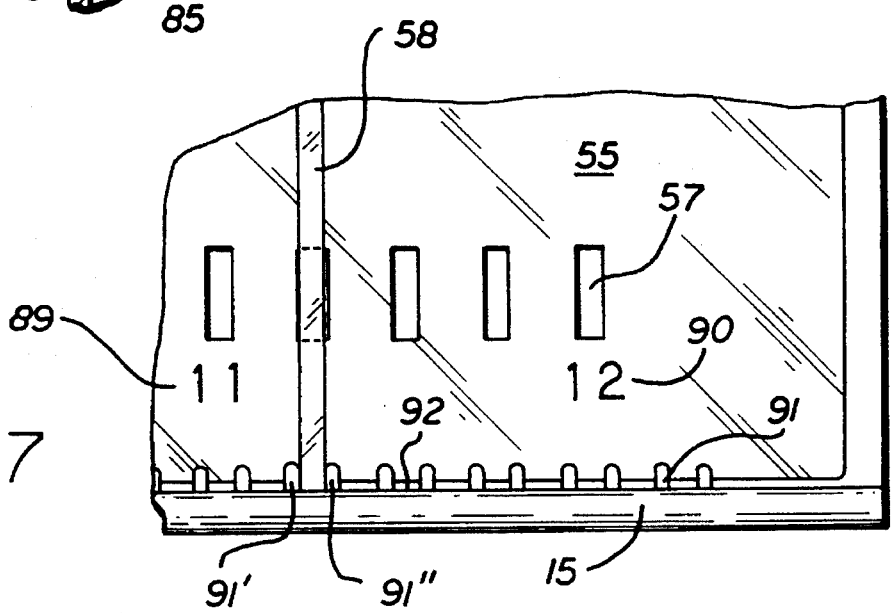
FIG. 7 is a detailed view of a portion of the tray of FIG. 6 indicated by arrow 7.

As seen in FIG. 7, contrasting indicia 89, 90, e.g., successive numerals 11, 12, may be imprinted. on tray portion 55 to assist in insertion of dividers 58 in the correct slots 57. Also, a plurality of spaced nubs or bosses 91, spaced apart a sufficient distance to receive divider 58 therebetween (see bosses 91', 91") are provided on the interior 92 of wall 15 extending inwardly of tray portion 55.

Referring again to FIG. 5, each tray 31 may have a plurality of spaced slots 56, 57, slots 56 being disposed in one linear row adjacent rear wall 16 and slots 57 being disposed in one linear row adjacent front wall 15. Successive ones of slots 56 are aligned with successive ones of slots 57.

A plurality of dividers 58, which may be of a transparent plastic material, are provided having downwardly extending spaced ears 59, 60. As indicated by dotted lines 61, 62, ears 59, 60 snap into aligned slots 56, 57 (e.g., slots 56', 57') in opposing in slots 56, 57.

It can be seen in FIG. 8 that divider 58 of FIG. 8 has been removed and re-inserted on the opposite side of tray portion 55 (FIG. 9). When trays 31 are inserted into openings 27 as heretofore discussed, the shoulders 20, 20' abut against the portions of rear wall 28 above openings 27 and below holes 46.

Although the rack 10 of FIG. 1 may be free-standing, it can be secured to a preexisting frame by custom fixtures or into a wire basket.

In U.S. Pat. No. 4,671,417 to Paul O'Brien, assigned to O.B.I. Co., there is disclosed a support fixture for retail product display systems. The teachings of this patent with respect to support fixture 10 and its insertion into an opening in a display structure is incorporated herein by reference.

Thus, support fixture 67 in FIG. 10 comprises an elongated support member 68 which is angled slightly upward from the horizontal and terminates in an upturned portion 69 at its outer end. Support member 68 is cantilevered outwardly from the front surface of a faceplate 70, cross-shaped in configuration (FIG. 12) which has a substantially planar rear surface 71 (FIG. 10) for imparting turning moments to front surface 72 of rear wall 28 in a region near mounting aperture 27.

An L-shaped, substantially planar gripping finger 73 extends rearwardly from rear surface 71 of face plate 70 and has a rearward-extending, upper portion 74 having a cross-section slightly less than that of mounting aperture 27 (see also FIG. 12). Gripping finger 73 extends rearward for a distance slightly greater than the thickness of the material of wall 28 and bends downwardly to a lower end 75 thereof to permit gripping finger 73 to be inserted into rectangular aperture 27 from the front side 72 of wall 28 without requiring any access to the back side thereof.

Thus, fixture 67 is essentially similar to fixture 12 of U.S. Pat. No. 4,671,417 and functions similarly thereto. However, openings 27 need not be as elongated as openings 46 in U.S. Pat. No. 4,671,417 nor need gripping finger 73 be as curved as finger 22 in U.S. Pat. No. 4,671,417.

Fixture 67 is thus shown in FIG. 10 as installed in one of the openings 27 and thus adapted to receive display materials thereon, such as suspended products 76, 77 (FIG. 1). Other products that need not be suspended, such as products 78 sitting on trays 31 in FIG. 1, can be spaced from an adjacent product, e.g., product 79, by dividers 58. The orientation of trays 31 (see FIGS. 8 and 9 as discussed thereof) can be varied to have the products, e.g., products 78, 79, resting on a tray portion 55 that slopes either front to rear or rear to front.

Figure 4:
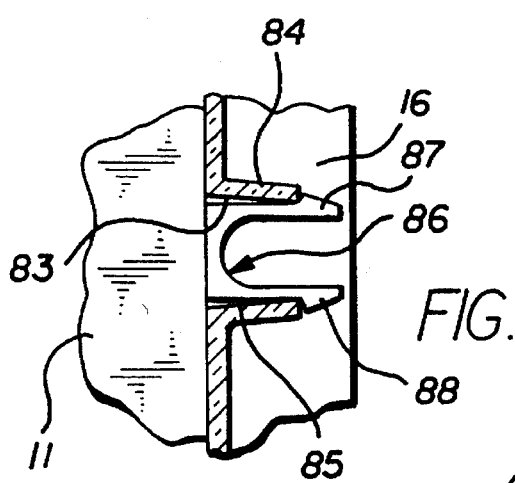
FIG. 4 is a view taken along lines 4—4 of FIG. 2.

As seen in FIGS. 2 and 4, sides 11, 12 snap fit to rear wall 16. Thus, rear wall 16 has a plurality of vertically spaced openings 83 defined on each side by spaced flanges 84, 85. Sides 11, 12 (side 11 shown in FIG. 4) have a plurality of spaced and aligned flexible protrusions 86 which snap fit into openings 83, the enlarged head portions 87, 88 serving to retain the protrusions 86 in a locking relationship to flanges 84, 85, as shown.

It can be seen in FIG. 1 that display rack 10 can be quickly and easily attached to a preexisting frame by custom fixtures or into a wire basket. It may also be free standing, if desired. As discussed, the sides 11, 12, bottom and top members 13, 54, and back wall 28 can be quickly and easily snapped together. The trays 31 can be snapped in place quickly and easily and the spacing therebetween varied by utilizing differing vertically spaced rows of slots 27. Shoulders 20, 21' of trays 31 abut against rear wall 28 giving firm support to the trays 31. The upper edge of wall 16 will be disposed under and resting upon nubs 46 as seen in dotted lines in FIG. 9. This serves to provide added and firm support to trays 31.

The dividers 58 can be moved apart or together to vary the spacing therebetween. The orientation of trays 31 can be quickly and easily reversed to allow the tray surfaces 55 to slope either front to rear, or rear to front, depending on the products displayed, their weight, size, trademark placement, etc. Other articles on blister packages or the like can be quickly and easily hung on support members 67. As seen in FIG. 10, added support to support member 67 is provided by the engagement of the upper edge of face plate 70 with nub 28.

The varying indicia can be used to properly align a tray when assembling the same to the rear and side walls. Display information associated with the tray can be quickly and easily changed.

The display rack disclosed herein can be shipped unassembled thus saving on shipping costs. The rack may be made out of any suitable plastic materials and is thus semi-permanent and cannot be easily taken apart once it is assembled. Thus, it will not accidentally come apart.

Any suitable dimensions may be used. For example, the rack 10 may be about 14" wide and 48" high. Such dimensions would allow rack 10 to be snapped onto preexisting wire basket hangers in retail stores or the like.

Since support fixture 67 snap into openings 27 and are supported therein by both the face plate 70, the gripping finger 73, and nubs 46, the fixtures 67 are properly aligned and will not wobble from side to side when products are suspended thereon. This gives an overall more pleasing appearance.

Slots 57 may be about 0.069 inches apart. The spacing between bosses 91 may be about 0.073 inches. Tray surfaces 55 may slope about 4°. The upper and lower surfaces 92, 93 (FIG. 8) of dividers 58 may be at an angle to the horizontal of about 4°. This allows the dividers 58 to be used on either side of the tray 31 by reversing the same. The spacing between successive nubs 46 and openings 26 may be about one-half inches center to center. The width of nubs 46 may be about 0.09 inches. Openings 26 may be about 0.51 inches in width.

Although a single display unit 10 is shown in FIG. 1, successive ones of display rack 10 can be assembled together. The overall height of rack 10 can vary and, in assembly, this can be accomplished by molding rear and side walls of varying lengths. Both shelves or trays 31 and support members 67 can be used on rack 10 wherever desired.

When trays 31 are oriented as in FIG. 8, the front wall 15 acts as a stop for products disposed on sloped surface 55. In FIG. 9, the tray 31 is oriented for gravity feed to the rear wall 28. The slight slope to surfaces 55 allows the product to rest on the shelves or trays 31 in an off-vertical manner. By providing support members 67 with a slight upward angle, products hung thereon, which have a tendency to lean forward, are displayed generally vertically.

As seen in FIGS. 13 to 15, wherein like numerals refer to like parts of the display rack of FIG. 1, rack 10 may have an elongated vertical flange 200 (FIG. 15) spaced inwardly from side wall 11 (a similar flange—not shown—may be spaced inwardly from side wall 12) extending substantially from top to bottom of display rack 10. A horizontally spaced ledge 201 couples flange 200 to side wall 11 extending front to rear as seen in FIG. 13. A front flange 202 extends across the front of side wall 11 and flange 200 (see FIG. 13). A first opening 203 (FIG. 13) is provided in wall 28 below ledge 201 and a second longer opening 204 is provided below opening 203. Flange 202 coincides generally with the upper portion of opening 204 (see FIG. 13). Ledge 201 has a downwardly extending lip 205 extending along the front thereof (see FIG. 15).

A hanging hook 206 (FIGS. 13 and 16) is provided having a first elongated flat portion 207 integral with an arcuate bottom portion 208. Bottom portion 208 is integral with a second elongated flat portion 209 which, in the FIG. 13 position, is generally equally spaced from first portion 207 and generally parallel thereto. A shoulder 210 (see particularly FIG. 14) is provided at the intersection of portions 208, 209 on the outside of hook 206.

Portion 209 extends upwardly to an integral hook portion 211 which extends outwardly and away from portion 209, then downwardly generally parallel thereto to a point 212. An integral extension portion 213, slightly arcuate, extends upwardly away from hook portion 211 and rearwardly thereof.

As seen in FIG. 14, hook 206 is inserted into the spacing between the front lip 205 (and flange 202) and rear wall 28. First elongated portion 207 is disposed against wall 28 with the upper terminal end 214 abutting against the underside of a rib 215' extending outwardly a short distance from wall 28. Shoulder 210 snaps into engagement with flange 202 and hook portion 211 extends outwardly (the normal position shown in FIG. 13—arcuate extension portion abutting against lip 205.

The final installed position shown in FIG. 13, with hook portion 211 protruding, allows the same to be inserted into an opening 215 of a preexisting display rack or framework 216 (shown in dotted lines). Thus, display rack 10 can be quickly and easily hung onto a preexisting rack by hooking into opening 215.

Hook 206 is of a resilient material, such as plastic, and can be pushed inwardly of rack 10 as seen in FIG. 14. Thus, a second rack 10' (identical to rack 10 shown in dotted lines) can abut against ledge 201 and flange 202 pushing hook portion 211 inwardly as shown. The opening 203 provides a space into which extension portion 213 can move while opening 204 also provides a space into which curved portion 208 can move. Thus, a plurality of racks 10, 10' can be stacked in like manner with hanging hooks 206 snapping into operative position when the racks are unstacked.

Figure 17A:
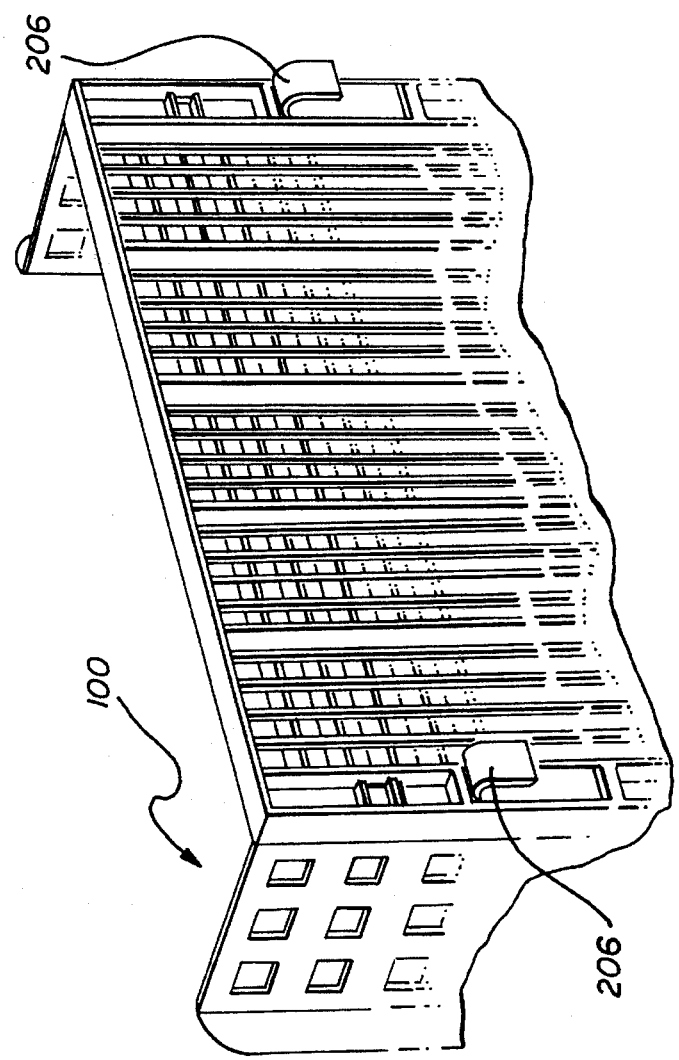
FIG. 17A is a rear perspective view of the display rack of FIG. 17, the hanging hooks shown in operative position.
Figure 17:
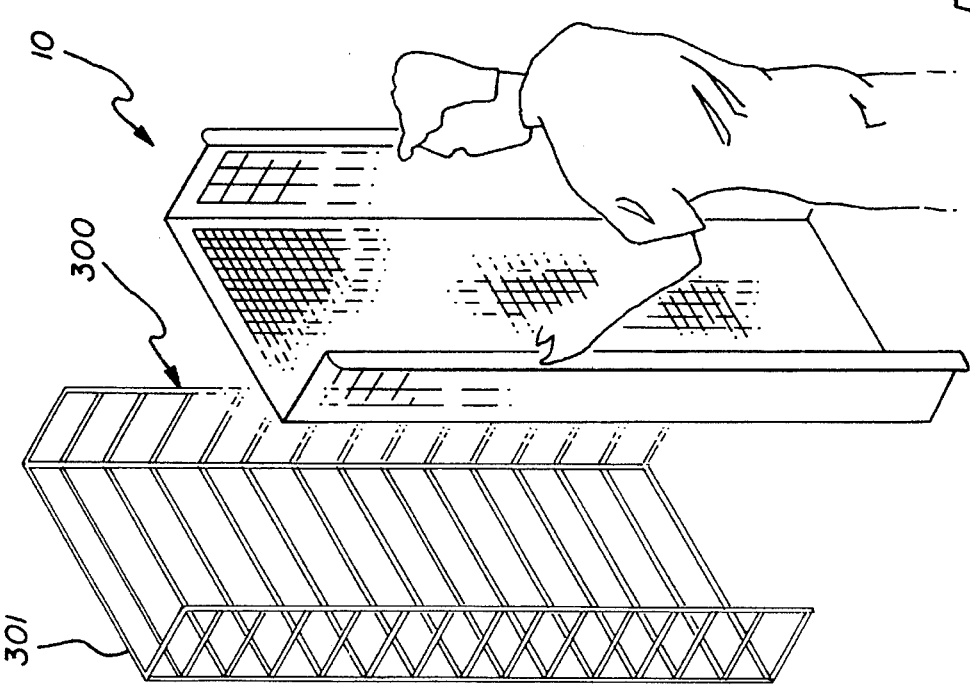
FIG. 17 is a perspective view illustrating how the display rack of FIGS. 1 to 16 is hung into a preexisting wire basket.

Thus, display rack 10 can be quickly and easily hung on to a preexisting wire rack 300 (FIG. 17). Wire rack 300 is of the general type found in stores and rack 10, as seen in FIG. 17A, has a pair of aforementioned hanging hooks 206 which have sprung out into operative position as discussed in conjunction with the description of FIGS. 13 and 14. Hooks 206 can thus be easily hung on to the horizontally extending wire members 301 (FIG. 17) of wire rack 300.

Figure 19:
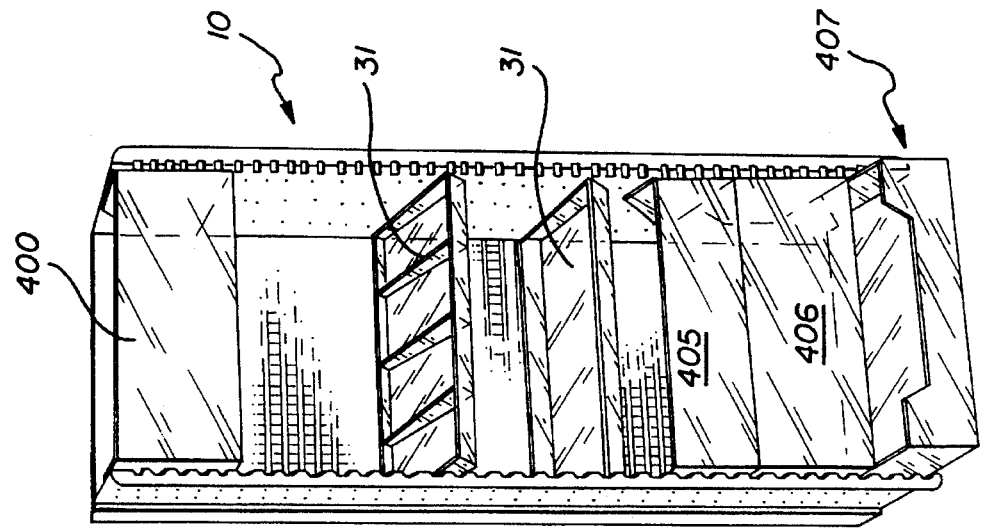
FIG. 19 is a perspective view of the assembled parts of FIG. 18.
Figure 18:
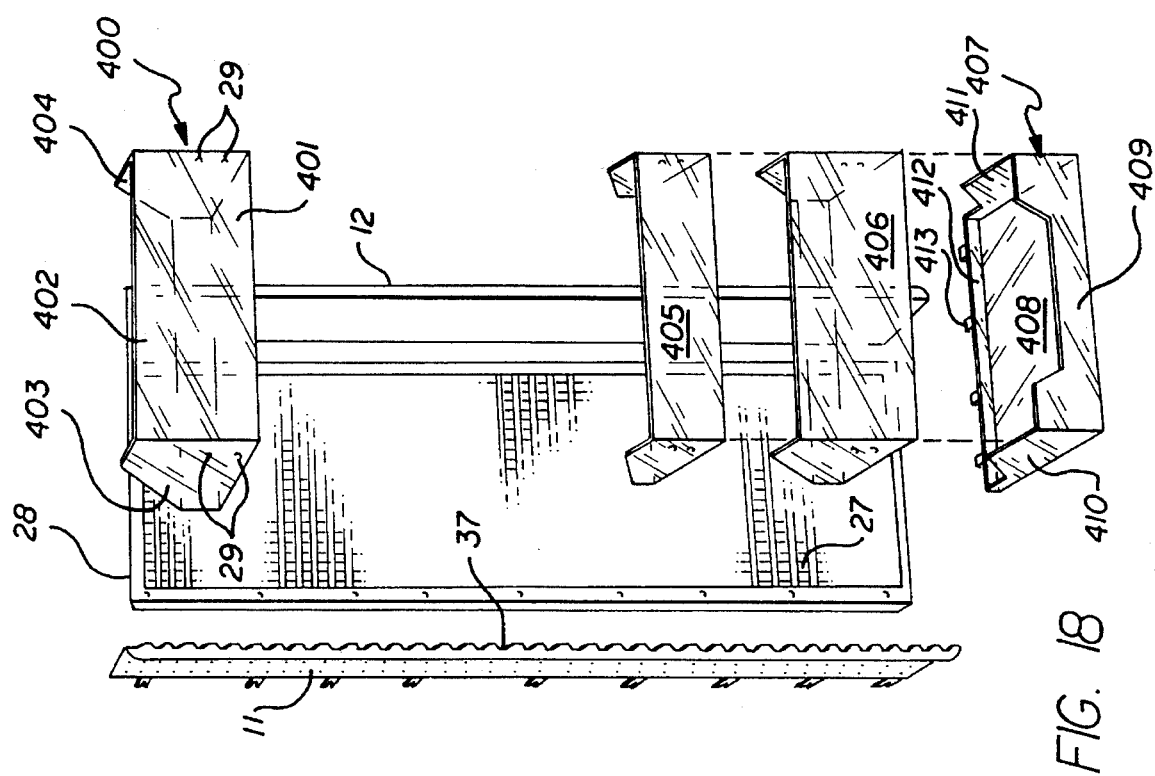
FIG. 18 is an exploded view of a rack of FIGS. 1 to 16 illustrating how a header and a collector tray may be assembled to the rack of FIGS. 1 to 16.

Display rack 10 is shown in FIG. 18 in exploded view prior to assembly of back wall 28 to side walls 11, 12 (top wall 54 is omitted). A display header 400 having a bottom wall 401, a front wall 402, and interconnected side walls 403, 404 is provided for attachment to rack 10. As seen in FIG. 18, header 400 may be of transparent mating and side walls 403, 404 have spaced knobs 29, receivable in notches 37 in side walls 11, 12 as heretofore described. The final installed position is shown in FIG. 19.

Header 400 may be provided in variable lengths and heights and may have decorative material or advertising material thereon or associated therewith.

The same header 400, as for example header 405 and 406 at bottom in FIG. 18, can be used in conjunction with a collector tray, as tray 407, to provide a dump bin for display rack 10.

Thus, as seen in FIG. 18, headers 405 and 406 are otherwise identical to header 400 but may be different in overall height. Thus, a number of headers may be used, of varying heights, to provide one single overall header height (see FIG. 19 wherein vertical stacked headers 405, 406, in juxtaposed relationship, provide a height substantially greater than the height of header 400).

Collector tray 407 (FIG. 18) has a bottom wall 408, a front wall 409, and interconnected upstanding side walls 410, 411. A rear wall 412 is provided similar to rear wall 16 of tray 13 (FIG. 11) with a plurality of rearwardly extending spaced pegs 413 (also similar to pegs 21 to 24). Pegs 413 are thus insertible into holes or openings 27 in rear wall 28 of display rack 10 as heretofore discussed.

The assembly of collector tray 407 and stacked headers 405, 406 is shown in FIG. 19. Thus, items can be dropped in back of upper header 405 and fall into collector tray 407 thus providing a dump bin for display rack 10. Headers 405, 406 and tray 407 may also be of transparent plastic material and may have advertising associated therewith if desired.

Display rack 10 can be made of clear acrylic plastic, or colored in any suitable manner to coordinate, for example, with a store decor or the products being displayed.

The rack 10 may be open at top or closed off by a tray, as top member 54. Normally, a six inch header will be used at top. If the shelf or tray 13 of FIG. 11 is used as the top wall, a display can be stacked on surface 14.

Shelves or trays 31 can be provided in differing widths (from front to rear) to accommodate products of varying sizes. Slots 36 in side walls 11, 12 allow for the addition of custom hooks or for additional signage.

It can be seen that there is disclosed a display rack that can be quickly and easily assembled and shelf spacing can be varied to accommodate different products. Preexisting wire racks can be used to attach the rack of this invention thereto. Preexisting hooks or support members of the type shown in U.S. Pat. No. 4,671,417 with slight modifications may be used.

Variations of the invention may occur to an artisan and the scope of this invention should only be limited by the scope of the appended claims.

I claim:

1. A display rack comprising:
   a pair of upstanding side walls;
   a rear wall disposed between said side walls interconnecting the same, said rear wall having a plurality of vertically spaced rows of horizontally aligned openings therein and a plurality of vertically spaced rows of horizontally aligned nubs protruding from said rear wall between said successive vertically spaced rows of openings, each of said nubs having an upperside and an underside, and
   at least one tray having connecting means thereon removably connecting said tray to both said side walls and certain ones of said openings in said rear wall, said at least one tray having an upper edge abutting against the underside of said nubs.

2. In the rack of claim 1 wherein said openings have centers of about one-half inches apart along said horizontal rows thereof.

3. In the rack of claim 1 wherein the spacing between the center of successive vertically spaced openings are one inch apart.

4. In the rack of claim 1 wherein the distance between successive horizontally spaced nubs is about one-half inch.

5. In the rack of claim 1 wherein each of said openings in said horizontal rows are separated from adjacent openings by a wall member.

6. In the rack of claim 5 wherein said nubs are vertically aligned with said wall members.

7. In the rack of claim 1 wherein said tray has a center tray portion sloping from front to rear thereof.

8. In the rack of claim 7 wherein said tray portion slopes about 4° from the horizontal.

9. In the rack of claim 1 wherein said tray has a front wall, a rear wall and interconnecting side walls, said connecting means including a plurality of insert pegs protruding rearwardly from said last mentioned rear wall, said pegs being receivable in selective ones of said spaced openings in said rear wall in a horizontal row thereof.

10. In the rack of claim 9 wherein said connecting means further includes said tray having a boss having an enlarged head protruding from each of said last-mentioned side walls having a longitudinal axis generally normal to the plane of said last mentioned side walls, said first mentioned side walls having openings therein configured similarly to said bosses, said bosses being receivable in said like configured openings in said first mentioned side walls when said pegs are disposed in said selective ones of said spaced openings.

11. In the rack of claim 1 wherein said openings of said rear wall of said rack are generally rectangular in cross-section.

12. In the display rack of claim 1 wherein said tray has a generally planar tray portion and including a plurality of elongated spaced slots in said tray portion at spaced locations thereon.

13. In the display rack of claim 12 including at least one vertical divider disposed in said slots.

14. In the display rack of claim 13 wherein said tray has a front wall, a rear wall and interconnecting side walls, said front wall having a plurality of protruding bosses extending inwardly of said tray and over said tray portion, the spacing between successive bosses being linearly aligned with said slots and of a width to accommodate said divider therebetween.

15. In the display rack of claim 13 wherein said divider has a main generally planar body portion with upper and lower edges, each of said edges being at an angle to the horizontal and generally parallel to each other whereby said divider may be inserted into said slots either front to rear of said tray portion or rear to front thereof.

16. In the display rack of claim 1 wherein a plurality of spaced openings are provided in said side walls.

17. In the display rack of claim 1 wherein said rear wall has a pair of spaced vertical side flanges, said side walls being interconnected to said flanges of said rear wall by a plurality of spaced openings in said flanges defined on each side thereof by a flange wall, said side walls having protrusions receivable in said spaced openings and retained therein by engagement with said flange walls.

18. In the display rack of claim 1 including an elongated vertical flange spaced inwardly from each of said side walls, a horizontal ledge interconnecting said flange to both said rear wall and each of said side walls, a flange interconnecting said first mentioned flange to each of said side walls spaced from said ledge, and a hanging hook mounted between said rear wall, each of said respective side walls and each of said respective first mentioned flanges.

19. In the display rack of claim 18 wherein said ledge has a downwardly extending lip extending between said respectively side walls and said respective first mentioned flanges, said rear wall having a first opening below said ledge and a second opening spaced from said first opening generally horizontally aligned with said second mentioned flange.

20. In the display rack of claim 19 wherein said hanging hook has a first elongated extension portion, a first lower integral curved portion, a second elongated extension portion integral with said first curved portion, and a hook portion integral with said second extension portion extending away from said second extension portion.

21. In the display rack of claim 20 wherein said first extension portion terminates in a terminal end normally abutting against the underside of a rib extending outwardly from said rear wall below said first opening, and a shoulder is provided at the intersection of said curved portion and said second extension portion on the outside of said hook normally abutting against said second flange, and an arcuate extension portion extends from the intersection of said hook portion and said second extension portion upwardly and away from said hook portion and rearwardly thereof normally abutting against the underside of said lip.

22. In the display rack of claim 21 wherein said hook is of a resilient material whereby said hook can be pushed inwardly of said rack whereby said hook portion is disposed between said rear wall and said lip and said second flange whereby a second display rack can be mounted against said first display rack in a generally flush stackable manner, said hook portion snapping outwardly of said first display rack when said second display rack is moved away from said first display rack.

23. In the display rack of claim 1 wherein the top of said rack is closed off by a header having a bottom wall, an interconnected upstanding front wall, and a pair of interconnected spaced side walls, said spaced side walls having interconnecting means thereon adapted to interconnect to spaced vertical slots in said side walls.

24. In the display rack of claim 23 wherein said header is of transparent plastic material.

25. In the display rack of claim 1 wherein the bottom of said rack is closed off by a collector tray having a bottom wall, an interconnected upstanding front wall, a pair of interconnected spaced side walls, and an interconnected rear wall having a plurality of spaced interconnecting members extending rearwardly therefrom receivable in one of said rows of horizontally aligned openings.

26. In the display rack of claim 25 including at least one header having a bottom wall, an interconnected upstanding front wall, and a pair of interconnected spaced side walls, said spaced side walls having interconnecting means thereon adapted to interconnect to spaced vertical slots in said side walls, said header being disposed above said collector tray.

27. In the display rack of claim 26 including a second header vertically mounted above said first-mentioned header.

28. In the display rack of claim 26 wherein said header and said tray are transparent plastic material.

* * * * *